US012762981B2

(12) United States Patent
Endo et al.

(10) Patent No.: US 12,762,981 B2
(45) Date of Patent: Oct. 13, 2026

(54) LIGHT EMITTING APPARATUS, DISPLAY APPARATUS, PHOTOELECTRIC CONVERSION APPARATUS, ELECTRIC EQUIPMENT, ILLUMINATION APPARATUS, MOBILE BODY, WEARABLE DEVICE, AND IMAGE FORMING APPARATUS

(71) Applicant: CANON KABUSHIKI KAISHA, Tokyo (JP)

(72) Inventors: Wataru Endo, Tokyo (JP); Mizuki Nagasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/082,484

(22) Filed: Mar. 18, 2025

(65) Prior Publication Data

US 2025/0218321 A1 Jul. 3, 2025

Related U.S. Application Data

(63) Continuation of application No. 17/854,062, filed on Jun. 30, 2022, now abandoned.

(30) Foreign Application Priority Data

Jul. 2, 2021 (JP) ................................ 2021-110881

(51) Int. Cl.
*G09G 3/00* (2006.01)
*G09G 3/3258* (2016.01)

(52) U.S. Cl.
CPC ........... *G09G 3/006* (2013.01); *G09G 3/3258* (2013.01); *G09G 2300/0819* (2013.01); *G09G 2330/12* (2013.01)

(58) Field of Classification Search
CPC .... G09G 3/006; G09G 3/3258; G09G 3/3233; G09G 3/32; G09G 3/3208; G09G 3/3607;
(Continued)

(56) References Cited

U.S. PATENT DOCUMENTS 6,404,009 B1 6/2002 Mori
7,045,860 B2 5/2006 Kikuchi
(Continued)

FOREIGN PATENT DOCUMENTS

CN 101551973 A 10/2009
CN 107004682 A 8/2017
(Continued)

OTHER PUBLICATIONS

Oct. 20, 2022 European Search Report in European Patent Appln. No. 22179123.9.

(Continued)

*Primary Examiner* — David Tung
(74) *Attorney, Agent, or Firm* — Venable LLP

(57) ABSTRACT

A light emitting apparatus is provided in which a pixel, that comprises a current path including a light emitting element, a driving transistor configured to supply a current corresponding to a luminance signal to the light emitting element, and a light emission control transistor configured to control light emission or non-light emission of the light emitting element, is arranged. In the current path, the light emission control transistor is arranged between the light emitting element and the driving transistor, and a withstand voltage of the driving transistor is lower than a withstand voltage of the light emission control transistor.

23 Claims, 12 Drawing Sheets

(58) Field of Classification Search
CPC ... G09G 2300/0819; G09G 2300/0809; G09G 2300/0861; G09G 2310/0252; G09G 2320/0233; G09G 2320/045; G09G 2320/04; G09G 2330/12; G09G 2380/10; H01L 27/1237
See application file for complete search history.

(56) References Cited

U.S. PATENT DOCUMENTS

| | | | | |
|---|---|---|---|---|
| 8,305,304 | B2 | 11/2012 | Kimura | |
| 8,791,929 | B2 | 7/2014 | Kimura | |
| 9,824,626 | B2 | 11/2017 | Kimura | |
| 10,014,408 | B1 | 7/2018 | Lin | |
| 10,885,843 | B1 | 1/2021 | Lu | |
| 11,120,728 | B2 | 9/2021 | Nagasaki | |
| 11,393,430 | B2 | 7/2022 | Nagasaki | |
| 12,236,863 | B2 | 2/2025 | Hamer | |
| 12,249,278 | B2 | 3/2025 | Hamer | |
| 2003/0030115 | A1 | 2/2003 | Kikuchi | |
| 2005/0030264 | A1 | 2/2005 | Tsuge | |
| 2008/0309649 | A1 | 12/2008 | Kojima | |
| 2009/0225010 | A1 | 9/2009 | Kimura | |
| 2009/0243978 | A1 | 10/2009 | Yamamoto | |
| 2010/0102386 | A1* | 4/2010 | You | H10D 64/516 257/E29.256 |
| 2013/0033470 | A1 | 2/2013 | Kimura | |
| 2013/0099700 | A1* | 4/2013 | Kreye | H05B 47/10 315/320 |
| 2014/0327663 | A1 | 11/2014 | Kimura | |
| 2015/0243718 | A1 | 8/2015 | Kwon | |
| 2018/0166011 | A1* | 6/2018 | Zhou | G09G 3/3266 |
| 2019/0251905 | A1 | 8/2019 | Yang | |
| 2019/0371244 | A1* | 12/2019 | Peng | H10K 59/1216 |
| 2022/0199931 | A1 | 6/2022 | Hamer | |
| 2022/0208871 | A1 | 6/2022 | Hamer | |
| 2023/0061540 | A1 | 3/2023 | Nagasaki | |

FOREIGN PATENT DOCUMENTS

| | | | |
|---|---|---|---|
| CN | 107424570 | A | 12/2017 |
| EP | 1434193 | A1 | 6/2004 |
| JP | 2003-060199 | A | 2/2003 |
| JP | 2006-243174 | A | 9/2006 |
| JP | 2008-310076 | A | 12/2008 |
| JP | 2014-145851 | A | 8/2014 |
| JP | 2015-018261 | A | 1/2015 |
| WO | 2021/154690 | A1 | 8/2021 |

OTHER PUBLICATIONS

Mar. 28, 2025 Japanese Official Action in Japanese Patent Appln. No. 2021-110881.

Aug. 4, 2025 Japanese Official Action in Japanese Patent Appln. No. 2021-110881.

Dec. 25, 2025 Chinese Official Action in Chinese Patent Appln. No. 202210774278.9.

Apr. 30, 2025 Chinese Official Action in Chinese Patent Appln. No. 202210774278.9.

Feb. 19, 2026 European Official Action in European Patent Appln. No. 22179123.9.

* cited by examiner

LIGHT EMITTING APPARATUS, DISPLAY APPARATUS, PHOTOELECTRIC CONVERSION APPARATUS, ELECTRIC EQUIPMENT, ILLUMINATION APPARATUS, MOBILE BODY, WEARABLE DEVICE, AND IMAGE FORMING APPARATUS

This application is a continuation of application Ser. No. 17/854,062 filed Jun. 30, 2022.

BACKGROUND OF THE INVENTION

Field of the Invention

The present invention relates to a light emitting apparatus, a display apparatus, a photoelectric conversion apparatus, an electric equipment, an illumination apparatus, a mobile body, a wearable device, and an image forming apparatus.

Description of the Related Art

A transistor that supplies a current for causing a light emitting element to emit light with a predetermined luminance needs to be formed by a transistor having a high withstand voltage of about 10 V. The element size of a high withstand voltage transistor is larger than the element size of a low withstand voltage transistor. Accordingly, the chip area of the driving circuit that supplies a current corresponding to the light emission luminance becomes large, and this can cause an increase in chip cost. Japanese Patent Laid-Open No. 2008-310076 describes that a high withstand voltage transistor is arranged between a display panel and a driving circuit and the driving circuit is formed by a low withstand voltage transistor.

In a light emitting apparatus such as a display panel which is formed by a plurality of light emitting elements, a luminance variation among the light emitting elements causes a degradation in image quality. In order to suppress the degradation in image quality, it is required to decrease the variation of the driving transistor, which controls the current flowing in the light emitting element in each pixel, so that the variation of the current flowing in each light emitting element decreases. In the arrangement described in Japanese Patent Laid-Open No. 2008-310076, the transistor arranged in the display panel is a high withstand voltage transistor. Therefore, in order to decrease the variation of the driving transistor, the area of the high withstand voltage transistor needs to be increased.

SUMMARY OF THE INVENTION

Each of some embodiments of the present invention has as its object to provide a technique that suppresses a light emission variation of a light emitting element while suppressing an increase in circuit scale.

According to some embodiments, a light emitting apparatus in which a pixel, that comprises a current path including a light emitting element, a driving transistor configured to supply a current corresponding to a luminance signal to the light emitting element, and a light emission control transistor configured to control light emission or non-light emission of the light emitting element, is arranged, wherein in the current path, the light emission control transistor is arranged between the light emitting element and the driving transistor, and a withstand voltage of the driving transistor is lower than a withstand voltage of the light emission control transistor, is provided.

Further features of the present invention will become apparent from the following description of exemplary embodiments (with reference to the attached drawings).

DESCRIPTION OF THE EMBODIMENTS

Figure 1:
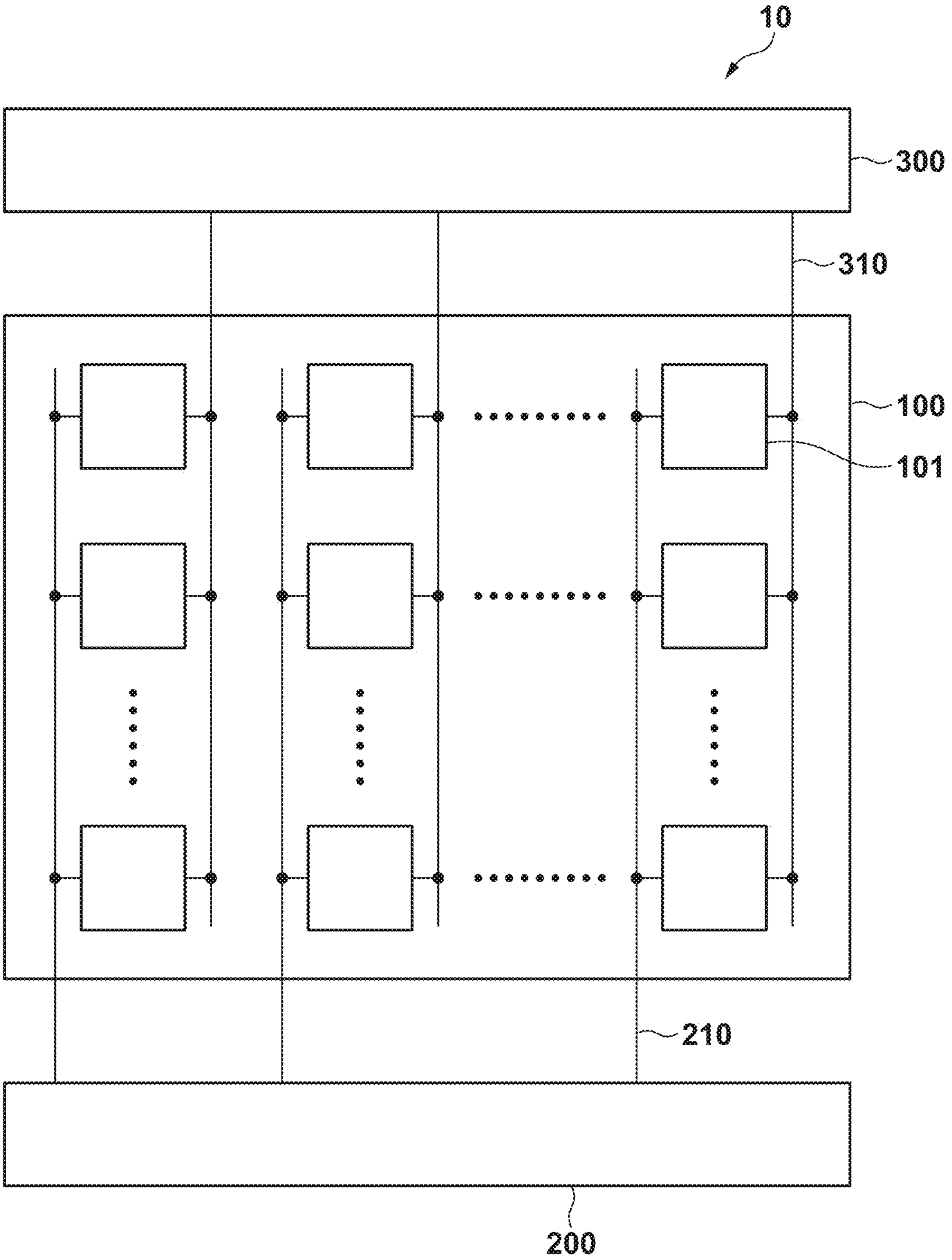
FIG. 1 is a view showing an arrangement example of a light emitting apparatus of an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

With reference to FIGS. 1 to 14B, a light emitting apparatus according to an embodiment of the present invention will be described. FIG. 1 is a block diagram showing the outline of a light emitting apparatus 10 of this embodiment. The light emitting apparatus 10 shown in FIG. 1 is a light emitting apparatus in which a light emitting element arranged in each pixel 101 is driven by a driving circuit which is formed on a semiconductor substrate and corresponds to each light emitting element. The light emitting element can have any material constitution/structure and can use a liquid crystal, an organic light emitting diode (OLED, organic EL), an inorganic LED, or a quantum dot LED. In this embodiment, it will be described that the light emitting apparatus 10 includes, among these light emitting elements, the light emitting element using an organic EL. As will be described later, in this embodiment, a case will be described in which a driving transistor for supplying a current corresponding to a luminance signal to the light emitting element is connected to the anode of the organic EL element and all transistors are p-type transistors. However, the present invention is not limited to this. For example, the polarity and conductivity type of each transistor and those of the semiconductor layer such as a substrate on which the transistors are formed may all be reversed. Alternatively, for example, the driving transistor may be a p-type transistor and the remaining transistors may be n-type transistors. Therefore, in the following description, for example, the "drain region" and "source region" of each transistor may be reversed appropriately. Potentials to be supplied and the connection between the components can be changed appropriately in accordance with the polarities and conductivity types of the components of the light emitting apparatus 10.

As shown in FIG. 1, the light emitting apparatus 10 includes a pixel array 100 and a driving unit arranged in the periphery of the pixel array 100. A plurality of the pixels 101 two-dimensionally arranged in a matrix are arranged in the pixel array 100, and a light emitting element 110 (shown in FIG. 2) is arranged in each pixel 101. The light emitting element 110 of each pixel 101 emits light with a light emission amount corresponding to an input signal voltage.

The driving unit is a circuit for driving each pixel 101. The driving unit includes, for example, a light emission control circuit 200 and a signal output circuit 300. In the pixel array 100, a light emission control line 210 and a signal line 310 are arranged along the column direction for each pixel column.

The light emission control circuit 200 outputs, via the light emission control line 210, a light emission control signal for controlling light emission or non-light emission of each pixel 101. The signal output circuit 300 outputs, via the signal line 310, a luminance signal (signal voltage) for controlling the luminance of each pixel 101. The light emission control line 210 may be formed by a plurality of control lines for each pixel column.

For example, for each column, the light emission control line 210 may be formed by the control lines, the number of which corresponds to the number of pixel rows, and each control line may be connected to each pixel 101 in a one-to-one relationship. In this case, the pixel array 100 can be configured to be capable of controlling the number of light emitting pixels for each pixel column.

Figure 2:
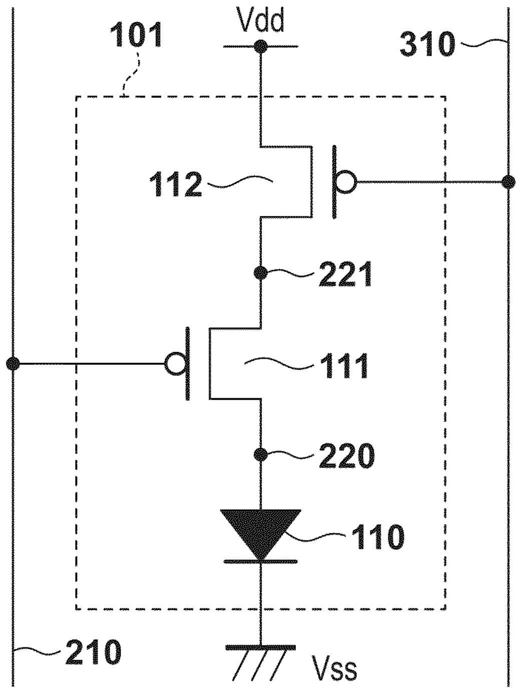
FIG. 2 is a view showing an arrangement example of a pixel of the light emitting apparatus shown in FIG. 1.

FIG. 2 is a circuit diagram showing an arrangement example of the pixel 101 arranged in the pixel array 100. As shown in FIG. 2, each of the plurality of pixels 101 includes a current path including the light emitting element 110, a driving transistor 112 for supplying a current corresponding to a luminance signal to the light emitting element 110, and a light emission control transistor 111 for controlling light emission or non-light emission of the light emitting element 110. Here, the total number of transistors arranged in the pixel 101 and the combination of the conductivity types of the transistors are merely examples, and they are not limited to this arrangement.

In the arrangement shown in FIG. 2, one main terminal (the drain in this embodiment) of the main terminals of the light emission control transistor 111 is connected to one main terminal of the light emitting element 110, and the connection point is referred to as a node 220. The other main terminal (the source in this embodiment) of the main terminals of the light emission control transistor 111 is connected to one main terminal (the drain in this embodiment) of the driving transistor 112, and the connection point is referred to as a node 221. The other main terminal (the source in this embodiment) of the driving transistor 112 is connected to a power supply voltage Vdd. The other main terminal of the light emitting element 110 is connected to a power supply voltage Vss. The control terminal (gate) of the light emission control transistor 111 is connected to the light emission control line 210. The control terminal (gate) of the driving transistor 112 is connected to the signal line 310.

The driving transistor 112 supplies a driving current, which corresponds to the signal voltage of the luminance signal supplied from the signal output circuit 300 via the signal line 310, from the power supply voltage Vdd to the light emission control transistor 111. The light emission control transistor 111 is controlled between a conductive state and a non-conductive state by a light emission control signal output from the light emission control circuit 200 via the light emission control line 210. When the light emission control transistor 111 is set in the conductive state in accordance with the light emission control signal, the driving current is supplied from the driving transistor 112 to the light emitting element 110. Thus, the light emitting element 110 emits light.

At this time, the light emission luminance of the light emitting element 110 changes in accordance with the driving current supplied from the driving transistor 112 and flowing in the current path including the light emitting element 110, the driving transistor 112, and the light emission control transistor 111. In the pixel array 100, when causing the light emitting element 110 arranged in each pixel 101 to emit light at a constant luminance, the signal output circuit 300 outputs, as a luminance signal, a constant voltage to the control terminal of each driving transistor 112 via each signal line 310. However, since there can be a variation of the characteristic such as a variation of a threshold voltage Vth among the driving transistors 112, even if the same voltage is supplied to the control terminals, the driving current supplied to the light emitting element 110 may vary among the pixels 101. It is known that, in general, the magnitude of the variation of the characteristic among the transistors is inversely proportional to the square root of the gate area of the transistor and proportional to the gate film thickness. Accordingly, in order to suppress the variation of the characteristic among the transistors, it is effective to increase the gate area and decrease the gate film thickness.

On the other hand, when causing the light emitting operation of the light emitting element 110 at a predetermined luminance, a forward voltage Vf of several V is required. Therefore, a voltage of about 10 V may be required between the power supply voltage Vdd and the power supply voltage Vss of the pixel 101. In general, a high withstand voltage transistor having a withstand voltage of about 10 V has a larger gate film thickness than a low withstand voltage transistor with a lower withstand voltage, or has a larger element area because it has a specific structure. Hence, the high withstand voltage transistor has a larger characteristic variation and a larger element area than the lower withstand voltage transistor.

In this embodiment, the driving transistor 112 is a low withstand voltage transistor, and has a lower withstand voltage than the light emission control transistor 111 which uses a high withstand voltage transistor. The light emission control transistor 111 is only required to perform a switching operation to control light emission or non-light emission of the light emitting element 110, so it does not largely contribute to the variation of the driving current. Therefore, although the light emission control transistor 111 uses a high withstand voltage transistor, it does not require a larger area than the driving transistor 112 having a low withstand voltage.

Figure 3:
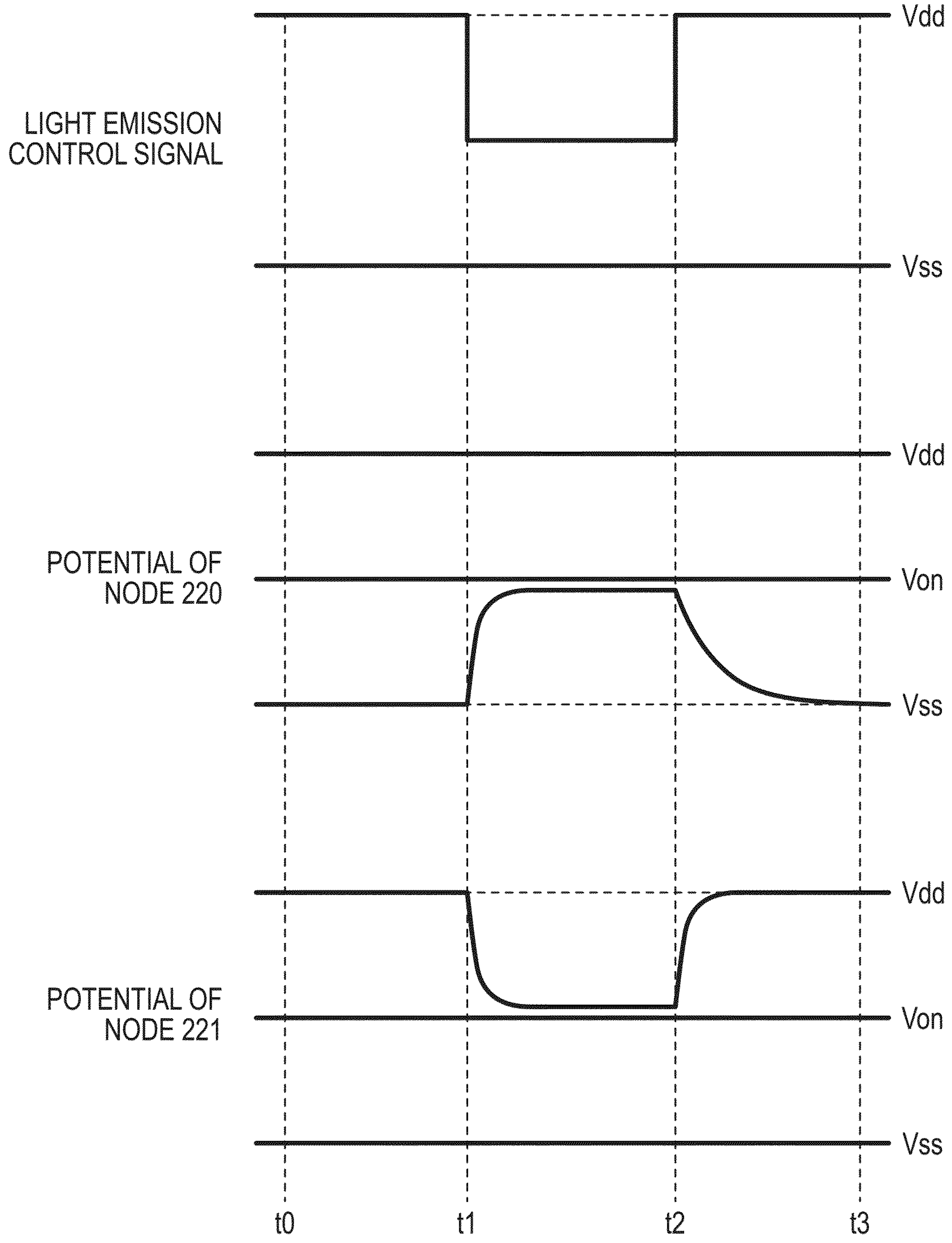
FIG. 3 is a timing chart showing an operation example of the pixel of the light emitting apparatus shown in FIG. 1.

FIG. 3 is a timing chart illustrating an operation of the pixel 101 shown in FIG. 2. Each of a period from time t0 to time t1 and a period from time t2 to time t3 represents a non-light emission period of the light emitting element 110. A period from time t1 to time t2 represents a light emission period of the light emitting element 110. In a period from time t0 to time t3, the driving transistor 112 is constantly active and supplies the signal voltage of a luminance signal for causing the light emitting element 110 to emit light at a predetermined luminance.

In the non-light emission period from time t0 to time t1, the light emission control signal supplied to the light emission control line 210 becomes a voltage close to the power supply voltage Vdd, so that the light emission control transistor 111 is turned off and set in the non-conductive state. In this case, the potential of the node 220 corresponding to the drain of the light emission control transistor 111 is decreased to the potential close to the power supply voltage Vss by the forward current generated in the light emitting element 110. Further, the potential of the node 221 corresponding to the drain of the driving transistor 112 is increased to the potential close to the power supply voltage Vdd by the driving transistor 112.

Then, in the light emission period from time t1 to time t2, the potential of the light emission control signal is decreased to the potential exceeding the threshold voltage of the light emission control transistor 111 so that the light emission control transistor 111 is set in the conductive state. Accordingly, the potential of each of the node 220 and the node 221 becomes close to the potential (to be referred to as a voltage Von hereinafter) obtained by adding the forward voltage Vf of the light emitting element 110 to the power supply voltage Vss, thereby causing the light emitting operation of the light emitting element 110.

In the operation described above, for the light emission control transistor 111, a potential difference corresponding to the difference between the power supply voltage Vdd and the power supply voltage Vss is generated between the gate and drain and between the drain and source in the non-light emission period. Therefore, it requires a high withstand voltage. On the other hand, for the driving transistor 112, a potential difference corresponding to difference between the power supply voltage Vdd and the power supply voltage Vss is not generated between the gate and the drain and between the drain and the source in the non-light emission period and the light emission period. Accordingly, it can be found that it does not require a high withstand voltage. That is, in the current path of the pixel 101 including the light emitting element 110, the driving transistor 112, and the light emission control transistor 111, the light emission control transistor 111 is arranged between the light emitting element 110 and the driving transistor 112. With this arrangement, the driving transistor 112 can have the withstand voltage lower than the withstand voltage of the light emission control transistor 111. Thus, the low withstand voltage transistor having a smaller characteristic variation and a smaller element area than the high withstand voltage transistor can be used as the driving transistor 112 that controls the current flowing through the light emitting element 110 arranged in the pixel 101. That is, it is possible to suppress the light emission variation of the light emitting element 110 while suppressing an increase in circuit scale.

In addition, when causing the light emitting operation of the light emitting element 110, a potential difference is generated due to the on-resistance of the light emission control transistor 111. Thus, the potential of the light emission control line 210 becomes slightly lower than the potential of the node 221. Here, the potential of the light emission control line 210 is only required to exceed the threshold voltage of the light emission control transistor 111, and does not have to decrease to the potential of the power supply voltage Vss. Accordingly, the light emission control circuit 200 that supplies, to the control terminal of the light emission control transistor 111, the light emission control signal for controlling light emission or non-light emission of the light emitting element 110 does not need a high withstand voltage. Therefore, the withstand voltage of the transistor arranged in the light emission control circuit 200 may be lower than the withstand voltage of the light emission control transistor 111.

For example, the difference between the withstand voltage of the driving transistor 112 and the withstand voltage of the transistor arranged in the light emission control circuit 200 may be smaller than the difference between the withstand voltage of the driving transistor 112 and the withstand voltage of the light emission control transistor 111. Further, for example, the withstand voltage of the driving transistor 112 may be equal to the withstand voltage of the transistor arranged in the light emission control circuit 200. In this case, the gate area and gate film thickness of the driving transistor 112 may be equal to those of the transistor arranged in the light emission control circuit 200. When the light emission control circuit 200 includes the arrangement as described above, the circuit scale of the light emission control circuit 200 can be decreased.

Figure 4:
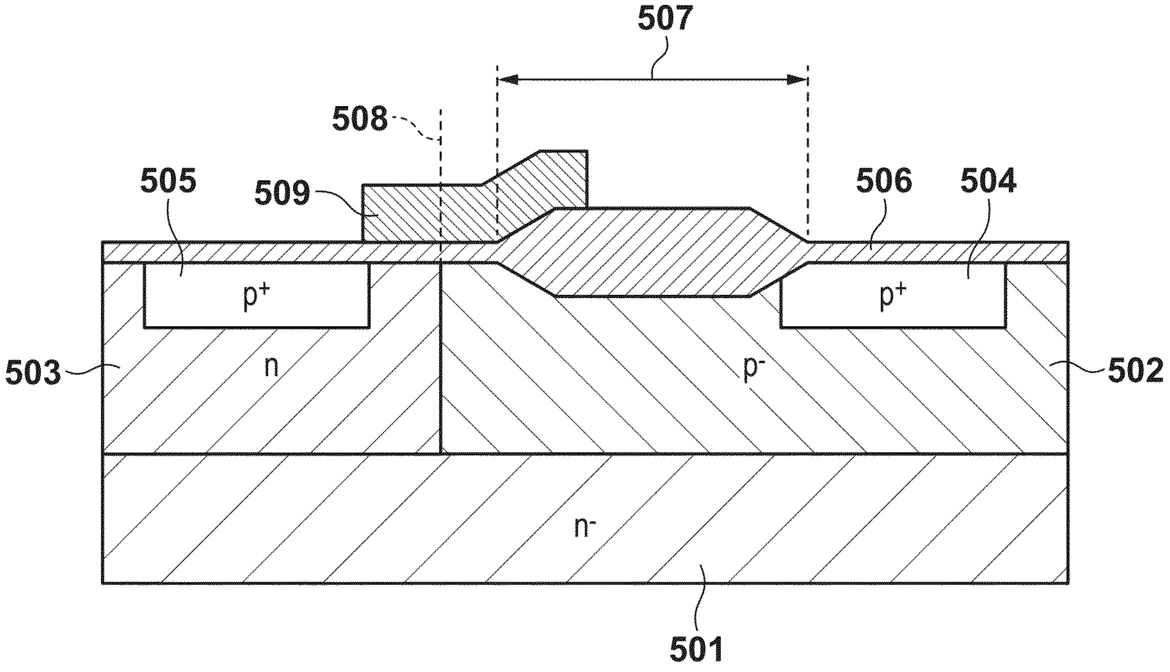
FIG. 4 is a view showing an arrangement example of a light emission control transistor arranged in the pixel of the light emitting apparatus shown in FIG. 1.

FIG. 4 is a schematic view showing an example of the arrangement of the light emission control transistor 111 which is the transistor having a high withstand voltage. Here, a high withstand voltage transistor having a p-type LOCOS offset structure is formed on an n-type semiconductor substrate (for example, a silicon substrate). A $p^-$-type well region 502 and an n-type well region 503 are formed in the upper surface of an $n^-$-type semiconductor substrate 501. A $p^+$-type drain region 504 is formed in a part of the surface of the well region 502, and a $p^+$-type source region 505 is formed in a part of the surface of the well region 503. A gate insulation film 506 (for example, silicon oxide) is formed on the entire surface of the semiconductor substrate 501, and a LOCOS is formed in the part of a region 507 on the well region 502. A gate electrode 509 is formed on the gate insulation film 506 on the well region 502 and the well region 503.

With the LOCOS offset structure as described above, the light emission control transistor 111 can have a high withstand voltage between the gate and the drain and between the drain and the source. Further, both the normal driving transistor 112 (low withstand voltage transistor), in which the gate electrode and the drain are not offset (the gate electrode is arranged on a part of the drain), and the light emission control transistor 111 as the high withstand voltage transistor can be implemented without largely increasing the number of steps of the manufacturing process.

Further, since a large gate voltage is not required to cause the switching operation of the light emission control transistor 111, as has been described above, the light emission control circuit 200 that supplies the light emission control signal can be formed by the low withstand voltage transistor alone. Similarly, the signal output circuit 300 for supplying a luminance signal to the control terminal of the driving transistor 112 having a low withstand voltage does not require a high withstand voltage. Therefore, the withstand voltage of the transistor arranged in the signal output circuit 300 may be lower than the withstand voltage of the light emission control transistor 111.

For example, the difference between the withstand voltage of the driving transistor 112 and the withstand voltage of the transistor arranged in the signal output circuit 300 may be smaller than the difference between the withstand voltage of the driving transistor 112 and the withstand voltage of the light emission control transistor 111. Further, for example, the withstand of the driving transistor 112 may be equal to the withstand voltage of the transistor arranged in the signal output circuit 300. In this case, the gate area and gate film thickness of the driving transistor 112 may be equal to those of the transistor arranged in the signal output circuit 300. When the signal output circuit 300 has the arrangement as described above, the circuit scale of the signal output circuit 300 can be decreased.

The light emission control transistor 111 is only required to be a transistor having a high withstand voltage, and is not limited to a LOCOS offset transistor. For example, the light emission control transistor 111 may be a transistor having a drain offset structure in which the gate electrode and the drain are offset so as not to overlap each other by the STI structure or the like.

With the arrangement described in this embodiment, it is possible to implement the light emitting apparatus 10 in which the light emission variation of the light emitting element 110 is suppressed while suppressing an increase in circuit area of the pixel array 100 in which the pixels 101 are arranged. It is also possible to suppress the circuit area of each of the light emission control circuit 200 and the signal output circuit 300.

Figure 5:
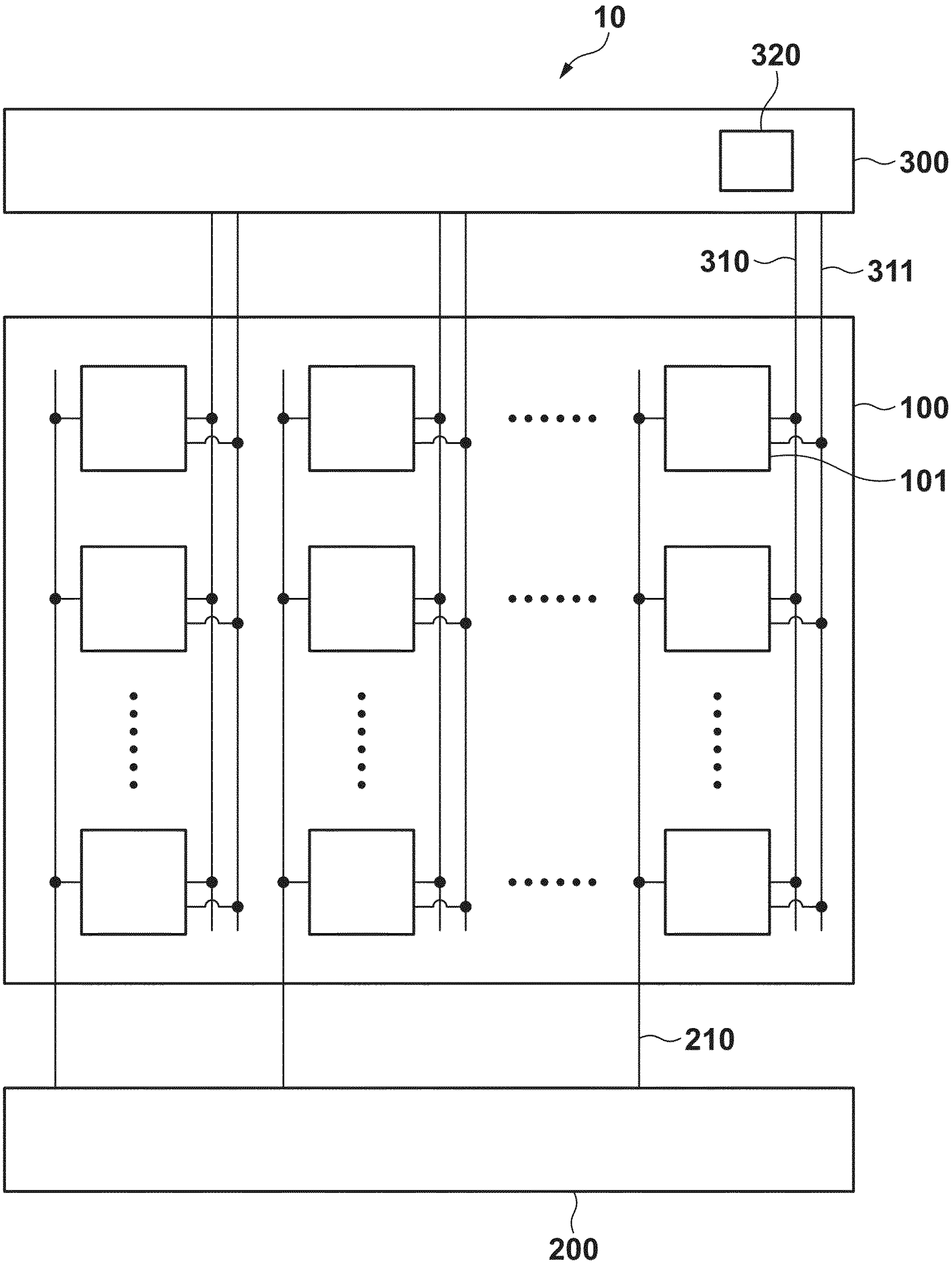
FIG. 5 is a view showing another arrangement example of the light emitting apparatus of the embodiment.

With reference FIGS. 5 and 6, a modification of the light emitting apparatus 10 described above will be described. In this embodiment, in order to further suppress the variation of the driving current in the pixel 101, the pixel 101 is formed by a cascode circuit. FIG. 5 is a block diagram showing a modification of the light emitting apparatus 10 shown in FIG. 1. As shown in FIG. 5, in the pixel array 100, a bias line 311 is arranged along the column direction for each pixel column. The bias line 311 is connected to the output end of the corresponding column in the signal output circuit 300, and supplies a bias signal to the pixel 101. The signal output circuit 300 can include a bias circuit 320 that generates a bias signal. In the arrangement shown in FIG. 5, the bias circuit 320 is arranged in the signal output circuit 300, but the present invention is not limited to this. The signal output circuit 300 and the bias circuit 320 may be arranged as independent circuits.

Figure 6:
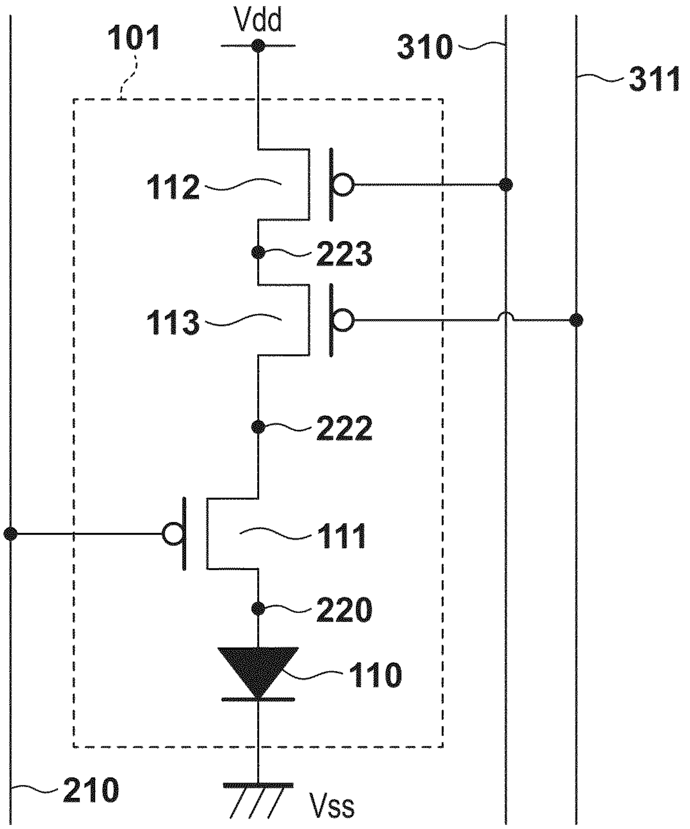
FIG. 6 is a view showing an arrangement example of a pixel of the light emitting apparatus shown in FIG. 5.

FIG. 6 is a circuit diagram showing an arrangement example of the pixel 101 arranged in the light emitting apparatus 10 shown in FIG. 5. As shown in FIG. 6, in the current path in which the driving current of the light emitting element 110 flows, a cascode transistor 113 for controlling the potential of the drain of the driving transistor 112 is arranged between the driving transistor 112 and the light emission control transistor 111.

More specifically, one main terminal (the drain in this embodiment) of the main terminals of the cascode transistor 113 is connected to one main terminal (the source in this embodiment) of the main terminals of the light emission control transistor 111, and the connection point is referred to as a node 222. The other main terminal of the cascode transistor 113 (the source in this embodiment) is connected to one main terminal (the drain in this embodiment) of the main terminals of the driving transistor 112, and the connection point is referred to as a node 223. The control terminal (gate) of the cascode transistor 113 is connected to the bias line 311, and receives the signal voltage of the bias signal supplied from the bias circuit of the signal output circuit 300.

In the pixel array 100, when causing the respective light emitting elements 110 to emit light at a constant luminance, the forward voltage Vf of several V is required. However, it is conceivable that the forward voltage Vf varies due to the characteristic variation of the light emitting element 110. If the forward voltage Vf varies, the potential of the node 220 corresponding to the drain potential of the light emission control transistor 111 varies. Thus, when the light emission control transistor 111 is turned on and set in the conductive state, the potential of the node 222 similarly varies. Further, when the driving current is large, the voltage drop caused by the power supply wiring impedance of the power supply voltage Vss cannot be ignored, and a larger variation may be superimposed on the above-described variation.

On the other hand, in the pixel 101 shown in FIG. 6, the driving transistor 112 and the cascode transistor 113 form a cascode circuit. Therefore, even if the potential of each of the node 220 and the node 222 varies, the cascode transistor 113 receiving the bias signal from the bias line 311 controls the potential of the node 223 corresponding to the drain potential of the driving transistor 112 to near a predetermined potential. Accordingly, even if the potential of the node 220 varies for each light emitting element 110, the driving current output from the driving transistor 112 can be kept constant.

Similar to the driving transistor 112, in the cascode transistor 113, a potential difference corresponding to the difference between the power supply voltage Vdd and the power supply voltage Vss is not generated between the gate and the drain and between the drain and source. Accordingly, it does not require a high withstand voltage. Therefore, the withstand voltage of the cascode transistor 113 may be lower than the withstand voltage of the light emission control transistor 111. For example, the difference between the withstand voltage of the driving transistor 112 and the withstand voltage of the cascode transistor 113 may be smaller than the difference between the withstand voltage of the driving transistor 112 and the withstand voltage of the light emission control transistor 111. Further, for example, the withstand voltage of the driving transistor 112 may be equal to the withstand voltage of the cascode transistor 113. In this case, the gate area and gate film thickness of the driving transistor 112 may be equal to those of the cascode transistor 113.

In addition, the bias circuit 320 of the signal output circuit 300 that supplies the bias signal to the control terminal of the cascode transistor 113 having a low withstand voltage does not require a high withstand voltage. Accordingly, the withstand voltage of the transistor arranged in the bias circuit 320 may be lower than the withstand voltage of the light emission control transistor 111. For example, the difference between the withstand voltage of the driving transistor 112 and the withstand voltage of the transistor arranged in the bias circuit 320 may be smaller than the difference between the withstand voltage of the driving transistor 112 and the withstand voltage of the light emission control transistor 111. Further, for example, the withstand voltage of the driving transistor 112 may be equal to the withstand voltage of the transistor arranged in the bias circuit 320. In this case, the gate area and gate film thickness of the driving transistor 112 may be equal to those of the transistor arranged in the bias circuit 320. When the bias circuit 320 has the arrangement as described above, the circuit scale of the bias circuit 320 can be decreased.

With the arrangement shown in FIGS. 5 and 6, it is possible to implement the light emitting apparatus 10 in which the light emission variation of the light emitting element 110 is suppressed while suppressing an increase in circuit area of the pixel array 100 in which the pixels 101 are arranged. It is also possible to suppress the circuit area of each of the light emission control circuit 200, the signal output circuit 300, and the bias circuit 320. For example, the withstand voltage of the light emission control transistor 111 arranged in each pixel 101 may be the highest among the transistors included in the light emitting apparatus 10. By limiting the use of a large transistor having a high withstand voltage to the light emission control transistor 111, it is possible to implement the light emitting apparatus 10 in which the light emission variation of the light emitting element 110 is suppressed while suppressing the circuit scale.

Here, application examples in which the light emitting apparatus 10 of this embodiment is applied to an image forming apparatus, a display apparatus, a photoelectric conversion apparatus, an electronic equipment, an illumination apparatus, a mobile body, and a wearable device will be described with reference to FIGS. 7A to 14B. In addition, the light emitting apparatus 10 is applicable to the exposure light source of an electrophotographic image forming apparatus, the backlight of a liquid crystal display apparatus, a light emitting device including a color filter in a white light source, and the like. The display apparatus may be an image information processing apparatus that includes an image input unit for inputting image information from an area CCD, a linear CCD, a memory card, or the like, and an information processing unit for processing the input information, and displays the input image on a display unit. In addition, a display unit included in a camera or an inkjet printer may have a touch panel function. The driving type of the touch panel function may be an infrared type, a capacitance type, a resistive film type, or an electromagnetic induction type, and is not particularly limited. The display apparatus may be used for the display unit of a multifunction printer.

Figure 7A:
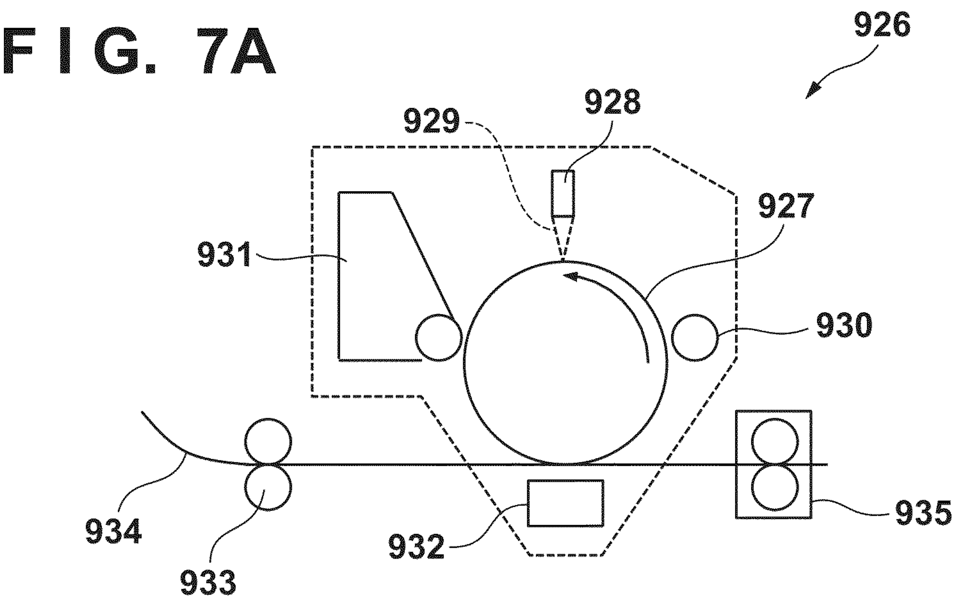
FIGS. 7A to 7C are views showing an example of an image forming apparatus using the light emitting apparatus of the embodiment.
Figure 7B:
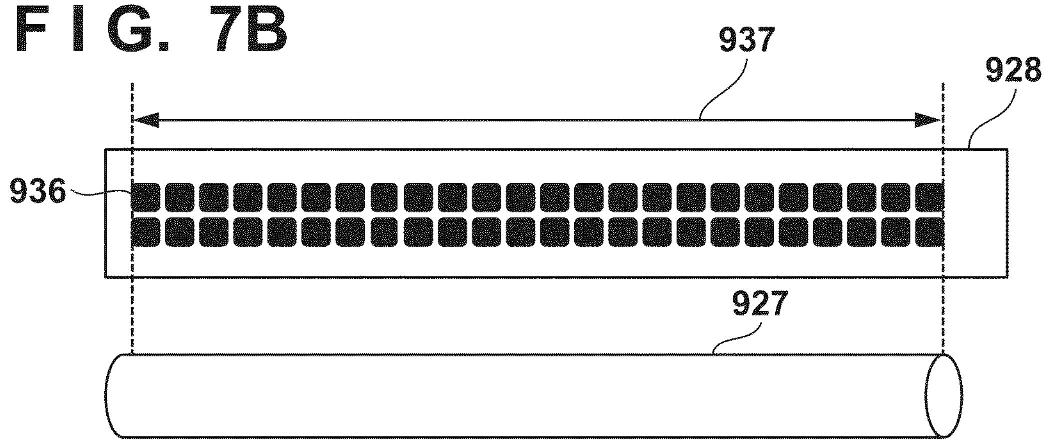
Figure 7C:
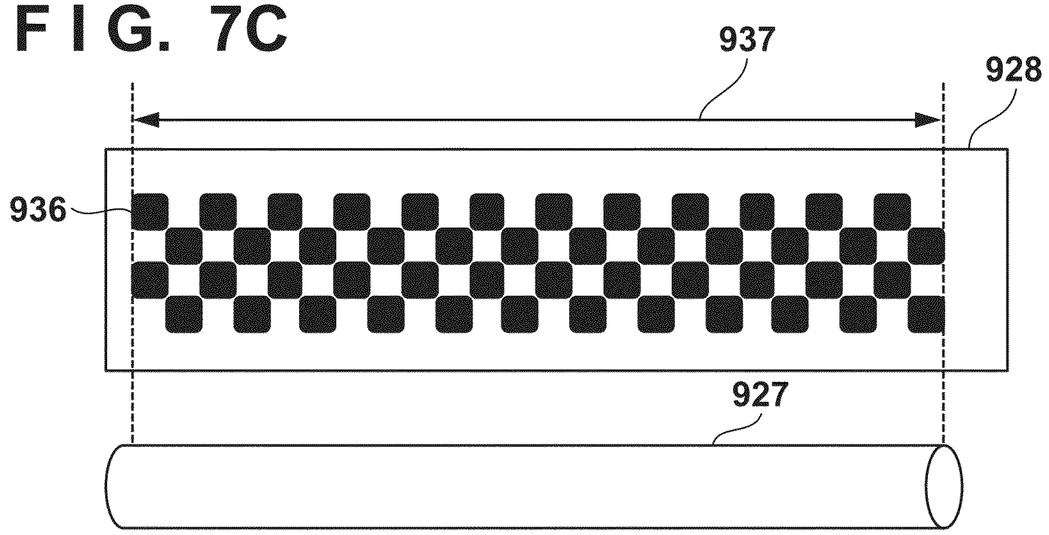

FIGS. 7A to 7C are schematic views showing an example of an image forming apparatus using the light emitting apparatus 10 of this embodiment. An image forming apparatus 926 shown in FIG. 7A includes a photosensitive member 927, an exposure light source 928, a developing unit 931, a charging unit 930, a transfer device 932, a conveyance unit 933 (a conveyance roller in the arrangement shown in FIG. 7A), and a fixing device 935.

Light 929 is emitted from the exposure light source 928, and an electrostatic latent image is formed on the surface of the photosensitive member 927. The light emitting apparatus 10 including the above-described light emitting element 110 can be applied to the exposure light source 928. The developing unit 931 can function as a developing device that contains a toner or the like as a developing agent and applies the developing agent to the exposed photosensitive member 927. The charging unit 930 charges the photosensitive member 927. The transfer device 932 transfers the developed image to a print medium 934. The conveyance unit 933 conveys the print medium 934. The print medium 934 can be, for example, paper or a film. The fixing device 935 fixes the image formed on the print medium.

Each of FIGS. 7B and 7C is a schematic view showing a plurality of light emitting units 936 arranged along the longitudinal direction on a long substrate in the exposure light source 928. The light emitting apparatus 10 including the above-described light emitting element 110 can be applied to each of the light emitting units 936. A direction 937 is a direction parallel to the axis of the photosensitive member 927, and represents the column direction in which the pixels 101 are arrayed in the pixel array 100 of the light emitting apparatus 10. This column direction matches the direction of the axis upon rotating the photosensitive member 927. This direction 937 can be referred to as the long-axis direction of the photosensitive member 927.

FIG. 7B shows a form in which the light emitting units 936 are arranged along the long-axis direction of the photosensitive member 927.

FIG. 7C shows a form, which is a modification of the arrangement of the light emitting units 936 shown in FIG. 7B, in which the light emitting units 936 are arranged in the column direction alternately between the first column and the second column. The light emitting units 936 are arranged at different positions in the row direction between the first column and the second column. In the first column, multiple light emitting units 936 are arranged spaced apart from each other. In the second column, the light emitting unit 936 is arranged at the position corresponding to the space between the light emitting units 936 in the first column. Also in the row direction, multiple light emitting units 936 are arranged spaced apart from each other. The arrangement of the light emitting units 936 shown in FIG. 7C can be referred to as, for example, an arrangement in a grid pattern, an arrangement in a staggered pattern, or an arrangement in a checkered pattern.

Figure 8:
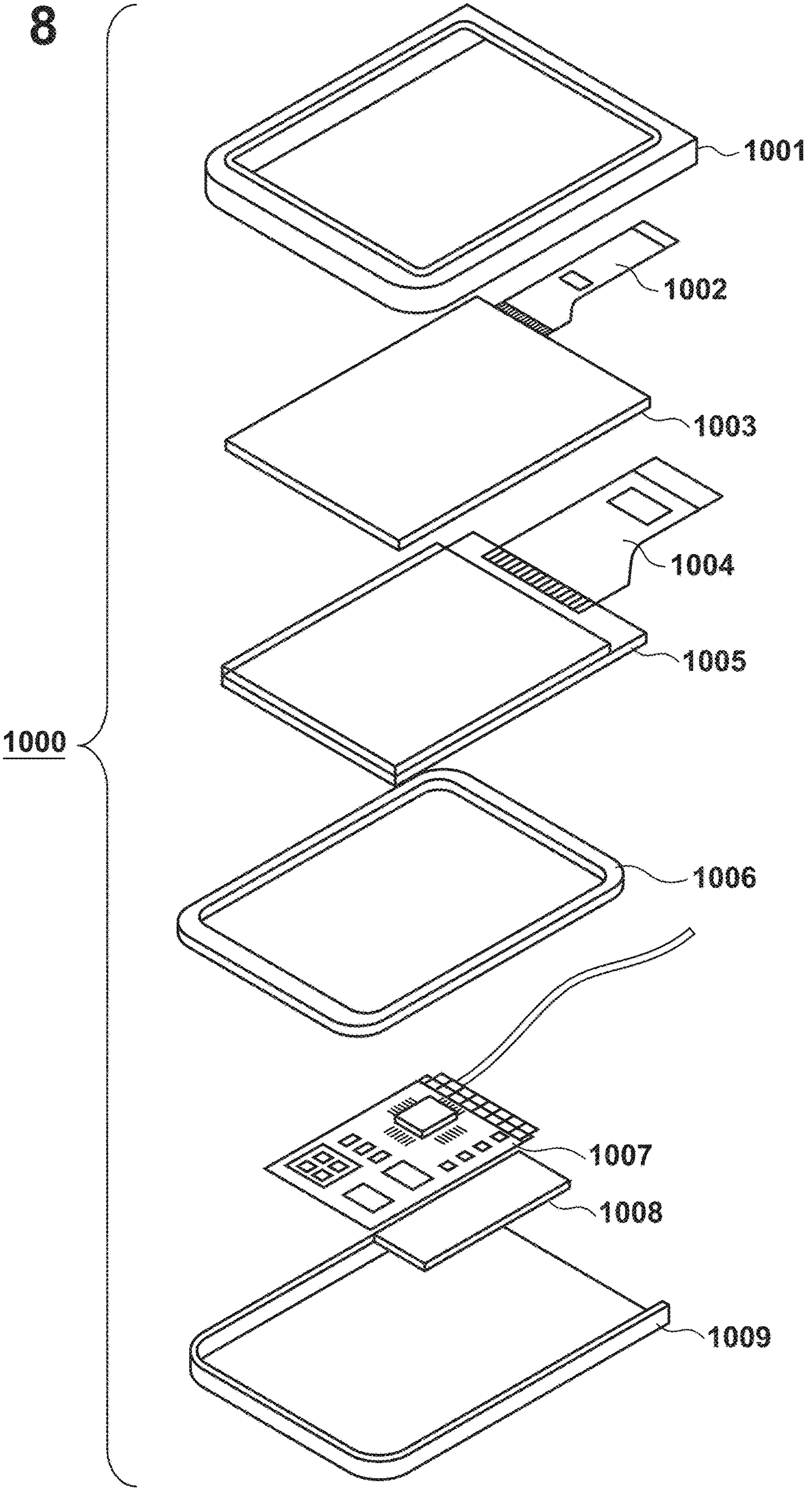
FIG. 8 is a view showing an example of a display apparatus using the light emitting apparatus of the embodiment.

FIG. 8 is a schematic view showing an example of a display apparatus using the light emitting apparatus 10 of this embodiment. A display apparatus 1000 may include, between an upper cover 1001 and a lower cover 1009, a touch panel 1003, a display panel 1005, a frame 1006, a circuit board 1007, and a battery 1008. The touch panel 1003 and the display panel 1005 are connected to flexible printed circuit FPCs 1002 and 1004, respectively. Active elements such as transistors are arranged on the circuit board 1007. The battery 1008 need not be provided if the display apparatus 1000 is not a portable device, and need not be provided in this position even if the display apparatus is a portable device. The above-described light emitting apparatus 10 can be applied to the display panel 1005. The light emitting apparatus 10 functioning as the display panel 1005 is connected to the active element such as the transistor arranged on the circuit board 1007 to be operated.

The display apparatus 1000 shown in FIG. 8 may be used for the display unit of a photoelectric conversion apparatus (image capturing apparatus) that includes an optical unit including a plurality of lenses and an image sensor that receives light having passed through the optical unit and photoelectrically converts the light into an electric signal. The photoelectric conversion apparatus may include a display unit which displays information acquired by the image sensor. The display unit may be a display unit exposed to the outside of the photoelectric conversion apparatus, or a display unit arranged in a viewfinder. The photoelectric conversion apparatus may be a digital camera or a digital video camera.

Figure 9:
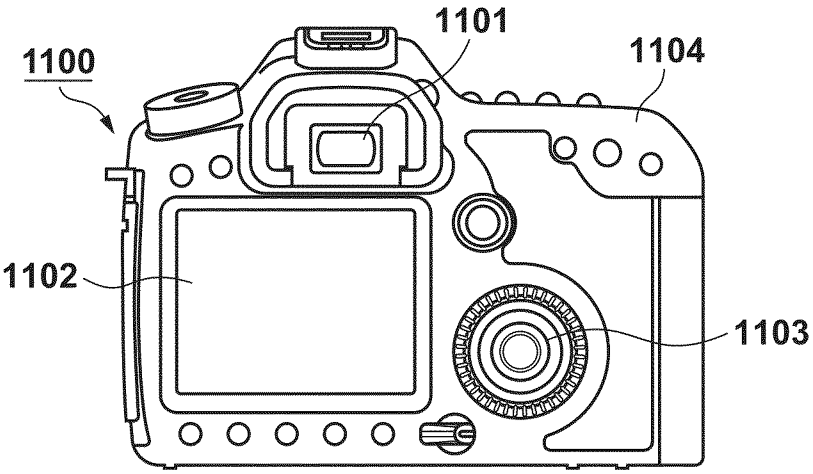
FIG. 9 is a view showing an example of a photoelectric conversion apparatus using the light emitting apparatus of the embodiment.

FIG. 9 is a schematic view showing an example of a photoelectric conversion apparatus using the light emitting apparatus 10 of this embodiment.

A photoelectric conversion apparatus 1100 may include a viewfinder 1101, a rear display 1102, an operation unit 1103, and a housing 1104. The photoelectric conversion apparatus 1100 can be referred to as an image capturing apparatus. The light emitting apparatus 10 described above can be applied to the viewfinder 1101 serving as the display unit. In this case, the light emitting apparatus 10 may display not only an image to be captured, but also environment information, an image capturing instruction, and the like. The environment information may include the intensity of ambient light, the direction of ambient light, the moving speed of an object, the possibility that the object is blocked by a shielding object, or the like.

Since the timing suitable for capturing an image is often a short time, it is better to display the information as quickly as possible. Therefore, the light emitting apparatus 10 including an organic light emitting material such as an organic EL element as the light emitting element 110 can be used in the viewfinder 1101. This is because the organic light emitting material has a high response speed. The light emitting apparatus 10 using the organic light emitting material is more suitably than a liquid crystal display apparatus in the apparatuses that require a high display speed.

The photoelectric conversion apparatus 1100 includes an optical unit (not shown). The optical unit includes a plurality of lenses and forms an image on a photoelectric conversion element (not shown), which receives light having passed through the optical unit, housed in the housing 1104. It is possible to adjust the focus by adjusting the relative positions of the plurality of lenses. This operation can be performed automatically.

The light emitting apparatus 10 may be applied to the display unit of an electronic equipment. In this case, the display unit may have both a display function and an operation function. Examples of the mobile terminal include a mobile phone such as a smartphone, a tablet, and a head mounted display.

Figure 10:
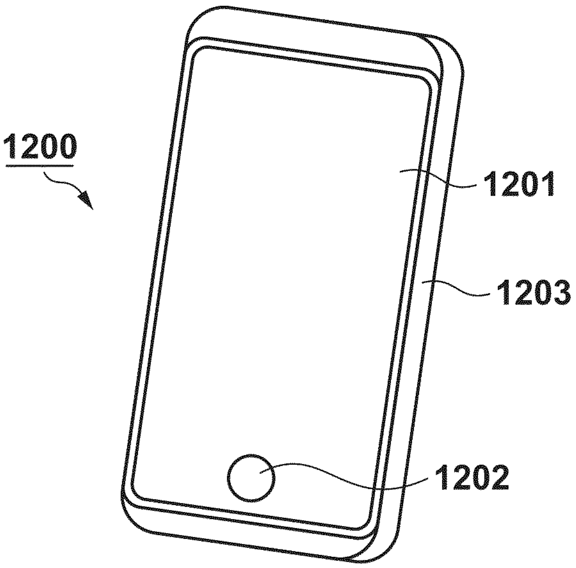
FIG. 10 is a view showing an example of an electric equipment using the light emitting apparatus of the embodiment.

FIG. 10 is a schematic view showing an example of an electronic equipment using the light emitting apparatus 10 of this embodiment. An electronic equipment 1200 includes a display unit 1201, an operation unit 1202, and a housing 1203. The housing 1203 may include a circuit, a printed board including the circuit, a battery, and a communication unit. The operation unit 1202 may be a button or a touch panel type sensing unit. The operation unit 1202 may be a biometrics unit that recognizes a fingerprint and releases a lock or the like. A portable device including a communication unit can also be called a communication equipment. The above-described light emitting apparatus 10 can be applied to the display unit 1201.

Figure 11A:
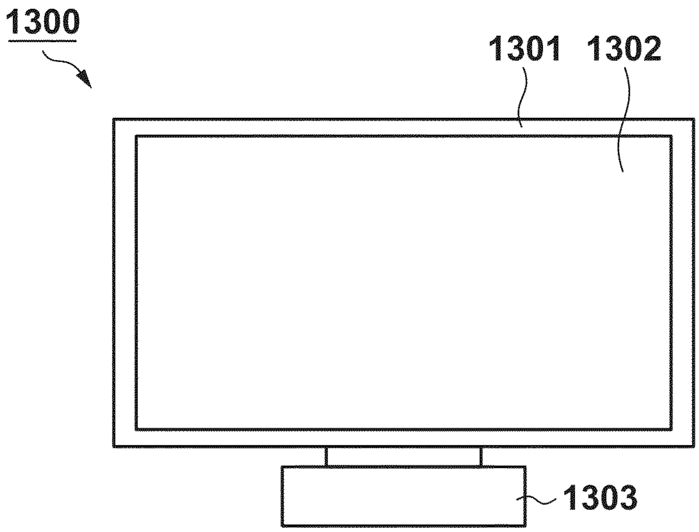
FIGS. 11A and 11B are views each showing an example of a display apparatus using the light emitting apparatus of the embodiment.
Figure 11B:
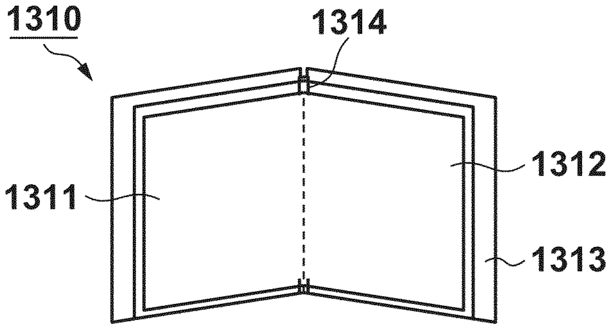

FIGS. 11A and 11B are schematic views showing examples of a display apparatus using the light emitting apparatus 10 of this embodiment. FIG. 11A shows a display apparatus such as a television monitor or a PC monitor. A display apparatus 1300 includes a frame 1301 and a display unit 1302. The above-described light emitting apparatus 10 can be applied to the display unit 1302. The display apparatus 1300 may include a base 1303 that supports the frame 1301 and the display unit 1302. The base 1303 is not limited to the form shown in FIG. 11A. For example, the lower side of the frame 1301 may serve as the base 1303. The frame 1301 and the display unit 1302 may be bent. The curvature radius may be between 5,000 mm (inclusive) and 6,000 mm (inclusive).

FIG. 11B is a schematic view showing another example of the display apparatus using the light emitting apparatus 10 of this embodiment. A display apparatus 1310 shown in FIG. 11B is configured to be bendable, and is a so-called foldable display apparatus. The display apparatus 1310 includes a first display unit 1311, a second display unit 1312, a housing 1313, and a bending point 1314. The above-described light emitting apparatus 10 can be applied to each of the first display unit 1311 and the second display unit 1312. The first display unit 1311 and the second display unit 1312 may be one seamless display apparatus. The first display unit 1311 and the second display unit 1312 can be divided at the bending point. The first display unit 1311 and the second display unit 1312 may display different images, or one image may be displayed with the first display unit and the second display unit.

Figure 12:
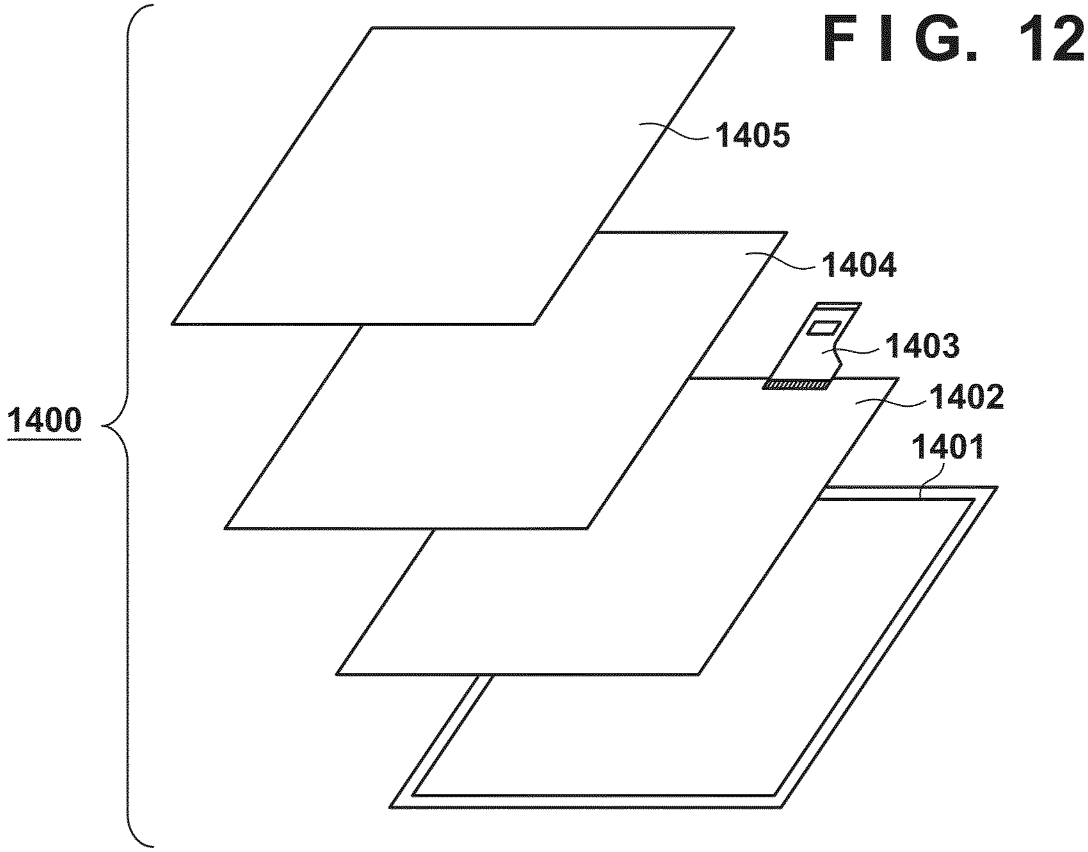
FIG. 12 is a view showing an example of an illumination apparatus using the light emitting apparatus of the embodiment.

FIG. 12 is a schematic view showing an example of an illumination apparatus using the light emitting apparatus 10 of this embodiment. An illumination apparatus 1400 may include a housing 1401, a light source 1402, a circuit board 1403, an optical film 1404, and a light diffusion unit 1405. The above-described light emitting apparatus 10 can be applied to the light source 1402. The optical film 1404 may be a filter that improves the color rendering property of the light source. The light diffusion unit 1405 can effectively diffuse light from the light source to illuminate a wide range for lighting up or the like. A cover may be provided in the outermost portion, as needed. The illumination apparatus 1400 may include both the optical film 1404 and the light diffusion unit 1405, or may include only one of them.

The illumination apparatus 1400 is, for example, an apparatus that illuminates a room. The illumination apparatus 1400 may emit light of white, day white, or any other color from blue to red. The illumination apparatus 1400 may include a light control circuit for controlling the light color. The illumination apparatus 1400 may include a power supply circuit connected to the light emitting apparatus 10 which functions as the light source 1402. The power supply circuit is a circuit that converts an AC voltage into a DC voltage. Note that white light has a color temperature of 4200 K, and day-white light has a color temperature of 5000 K. The illumination apparatus 1400 may also include a color filter. Further, the illumination apparatus 1400 may include a heat dissipation portion. The heat dissipation portion releases the heat in the apparatus to the outside of the apparatus, and examples thereof include a metal having high specific heat, liquid silicon, and the like.

Figure 13:
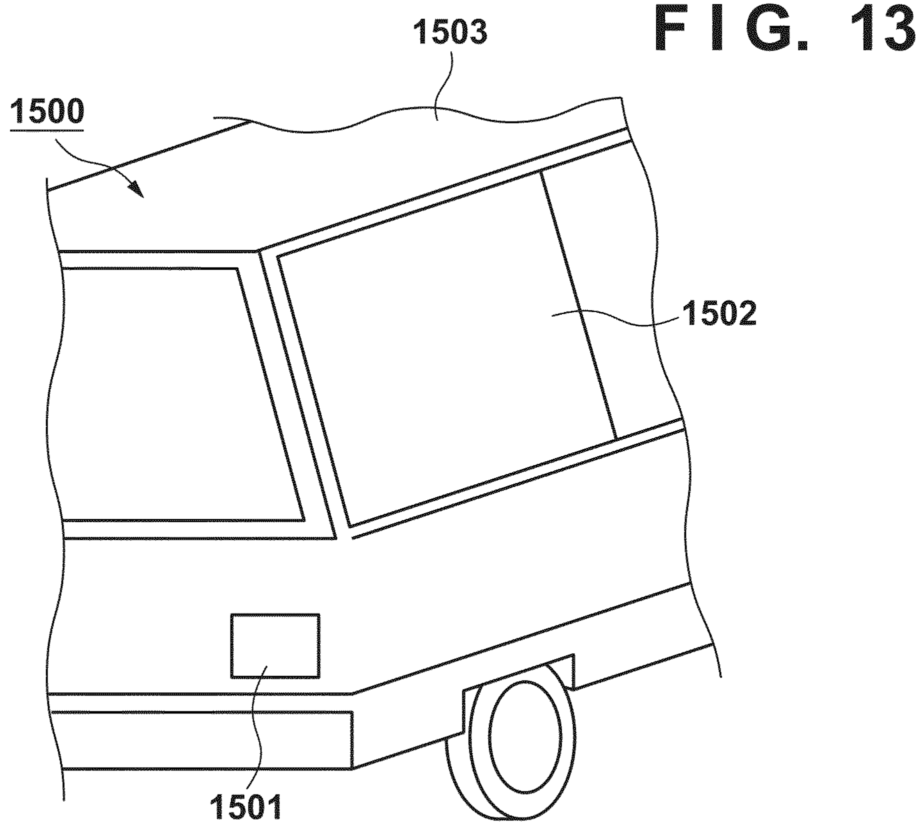
FIG. 13 is a view showing an example of a mobile body using the light emitting apparatus of the embodiment.

FIG. 13 is a schematic view showing an automobile including a tail lamp which is an example of the lighting unit for an automobile using the light emitting apparatus 10 of this embodiment. An automobile 1500 includes a tail lamp 1501, and may turn on the tail lamp 1501 when a brake operation or the like is performed. The light emitting apparatus 10 of this embodiment may be used in a head lamp as the lighting unit for an automobile. The automobile is an example of a mobile body, and the mobile body may be a ship, a drone, an aircraft, a railroad car, an industrial robot, or the like. The mobile body may include a body and a lighting unit provided in the body. The lighting unit may inform the current position of the body.

The above-described light emitting apparatus 10 can be applied to the tail lamp 1501. The tail lamp 1501 may include a protective member that protects the light emitting apparatus 10 which functions as the tail lamp 1501.

The protective member has a certain degree of strength, and can be made from any material as long as it is transparent. The protective member may be made from polycarbonate or the like. Further, the protective member may be made from polycarbonate mixed with furandicarboxylic acid derivative, acrylonitrile derivative, or the like.

The automobile 1500 may include a body 1503 and windows 1502 attached thereto. The window may be a window for checking the front or rear of the automobile, or may a transparent display. The above-described light emitting apparatus 10, in which the light emitting element 110 can include an organic light emitting material such as an organic EL, may be used in the transparent display. In this case, the components such as the electrodes included in the light emitting apparatus 10 are formed by transparent members.

Application examples of the light emitting apparatus 10 according to the embodiments described above will be described with reference to FIGS. 14A and 14B. The light emitting apparatus 10 is applicable to, for example, a system that can be worn as a wearable device such as smart glasses, an HMD (Head Mounted Display), smart contact lenses, or the like. An image capturing display apparatus that is used in such an application example includes an image capturing apparatus that can photoelectrically convert visible light and a light emitting apparatus that can emit visible light.

Figure 14A:
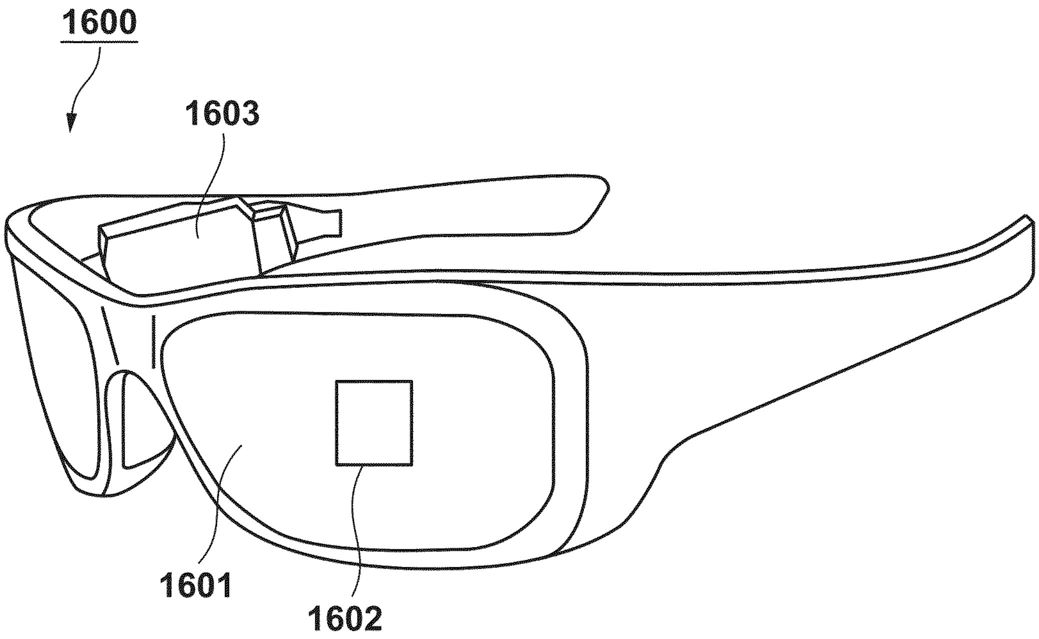
FIGS. 14A and 14B are views each showing an example of a wearable device using the light emitting apparatus of the embodiment.

FIG. 14A illustrates a pair of glasses 1600 (smart glasses) according to an application example. An image capturing apparatus 1602 such as a CMOS sensor or an SPAD is arranged on the front surface side of a lens 1601 of the glasses 1600. Also, the light emitting apparatus 10 described above is arranged on the back surface side of the lens 1601.

The pair of glasses 1600 further includes a control apparatus 1603. The control apparatus 1603 functions as a power supply that supplies power to the image capturing apparatus 1602 and the light emitting apparatus 10 according to the embodiments. The control apparatus 1603 controls the operation of the image capturing apparatus 1602 and the operation of the light emitting apparatus 10. An optical system for focusing light to the image capturing apparatus 1602 is formed on the lens 1601.

Figure 14B:
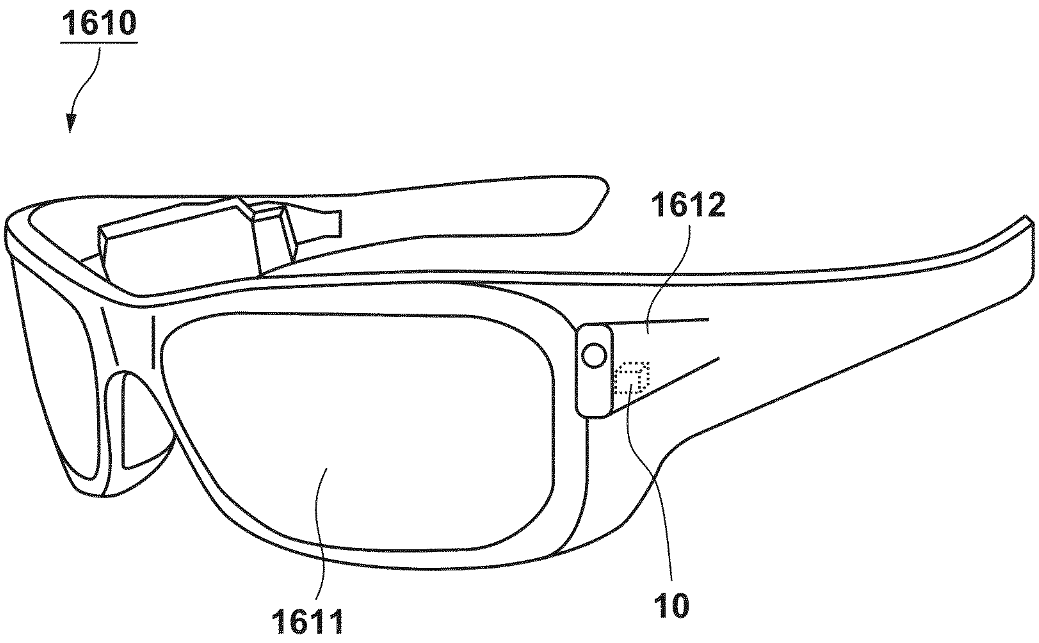

FIG. 14B illustrates a pair of glasses 1610 (smart glasses) according to another application example. The pair of glasses 1610 includes a control apparatus 1612, and an image capturing apparatus corresponding to the image capturing apparatus 1602 and the light emitting apparatus 10 are incorporated in the control apparatus 1612. An optical system for projecting light emitted from the image capturing apparatus and the light emitting apparatus 10 in the control apparatus 1612 is formed in a lens 1611, and an image is projected onto the lens 1611. In addition to functioning as a power supply that supplies power to the image capturing apparatus and the light emitting apparatus 10, the control apparatus 1612 also controls the operation of the image capturing apparatus and the operation of the light emitting apparatus 10. The control apparatus 1612 may also include a line-of-sight detection unit that detects the line of sight of a wearer.

Infrared light can be used for the line-of-sight detection. An infrared light emitting unit emits infrared light to the eyeball of a user who is gazing at a displayed image. When the emitted infrared light is reflected by the eyeball and detected by an image capturing unit including a light receiving element, a captured image of the eyeball can be obtained. Image quality degradation is reduced by providing a reduction means that reduces the light from the infrared light emitting unit to the display unit in a planar view.

The line of sight of the user to the displayed image is detected from the captured image of the eyeball obtained by the image capturing operation using the infrared light. A known method can be arbitrarily applied for the line-of-sight detection using the captured eyeball image. As an example, a line-of-sight detection method based on Purkinje images caused by the reflection of the emitted light on the cornea can be used.

More specifically, line-of-sight detection processing is performed based on a pupil-cornea reflection method. The line of sight of the user is detected by using the pupil-cornea reflection method to calculate a line-of-sight vector representing the direction (rotation angle) of the eyeball based on the image of the pupil and the Purkinje images included in the captured image of the eyeball.

A light emitting apparatus 10 according to one embodiment of the present invention may include an image capturing apparatus including a light receiving element, and control a displayed image based on the line-of-sight information of the user obtained from the image capturing apparatus.

More specifically, in the light emitting apparatus 10, a first field-of-view region which is gazed at by the user and a second field-of-view region other than the first field-of-view region are determined based on the line-of-sight information. The first field-of-view region and the second field-of-view region may be determined by a control apparatus of the light emitting apparatus 10. Alternatively, the first field-of-view region and the second field-of-view region may be determined by an external control apparatus and the light emitting apparatus 10 may receive information corresponding to this determination. Control can be performed in the display region of the light emitting apparatus 10 so that the display resolution of the first field-of-view region will be higher than the display resolution of the second field-of-view region. That is, the resolution of the second field-of-view region may be lowered more than the resolution of the first field-of-view region.

In addition, the display region includes a first display region and a second display region different from the first display region, and a region with a high degree of priority is determined from the first display region and the second display region of the display region based on the line-of-sight information. The first display region and the second display region may be determined by the control apparatus of the light emitting apparatus 10. Alternatively, the first display region and the second display region may be determined by an external control apparatus and the light emitting apparatus 10 may receive information corresponding to this determination. Control may be performed so that the resolution of a region with the high degree of priority will be set higher than the resolution of a region other than the region with the high degree of priority. That is, the resolution of a region with a relatively low degree of priority may be set low.

Note that an AI may be used for the determination of the first field-of-view region and the region with the high degree of priority. The AI may be a model configured to estimate, from an image of the eyeball, the angle of the line of sight and the distance to an object as the target of the gaze by using the image of the eyeball and the direction actually gazed at by the eyeball of the image as the teaching data. The light emitting apparatus 10, the image capturing apparatus, or an external apparatus may include the AI program. If the AI program is included in an external apparatus, information determined by the AI program will be transmitted to the light emitting apparatus 10 by communication.

In a case in which display control is to be performed based on visual recognition detection, the light emitting apparatus 10 according to the embodiments can be applied to a pair of smart glasses that further includes an image capturing apparatus configured to capture the outside. The smart glasses can display the captured outside information in real time.

The present invention is not limited to the above-described embodiments, and various changes and modifications can be made within the spirit and scope of the present invention. Therefore, to apprise the public of the scope of the present invention, the following claims are made.

According to the present invention, it is possible to provide a technique that suppresses a light emission variation of a light emitting element while suppressing an increase in circuit scale.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-110881, filed Jul. 2, 2021, which is hereby incorporated by reference herein in its entirety.

What is claimed is:

1. A light emitting apparatus comprising:

(1) a light emitting element;

(2) a driving transistor configured to supply a current to the light emitting element;

(3) a light emission control transistor configured to control light emission or non-light emission of the light emitting element; and (4) a light emission control circuit configured to supply a light emission control signal for controlling light emission or non-light emission of the light emitting element, wherein the light emission control transistor is arranged between the light emitting element and the driving transistor, wherein the light emission control transistor is in an off-state during a non-light emission period, wherein a withstand voltage of the driving transistor is lower than a withstand voltage of the light emission control transistor, and wherein a withstand voltage of a transistor arranged in the light emission control circuit is lower than the withstand voltage of the light emission control transistor.

2. The apparatus according to claim 1, wherein a difference between the withstand voltage of the driving transistor and the withstand voltage of the transistor arranged in the light emission control circuit is smaller than a difference between the withstand voltage of the driving transistor and the withstand voltage of the light emission control transistor.

3. The apparatus according to claim 2, wherein the withstand voltage of the driving transistor is equal to the withstand voltage of the transistor arranged in the light emission control circuit.

4. The apparatus according to claim 1, wherein the light emission control transistor comprises a drain offset structure.

5. The apparatus according to claim 1, wherein the light emission control transistor comprises a LOCOS offset structure.

6. The apparatus according to claim 1, wherein a cascode transistor configured to control a potential of a drain of the driving transistor is further arranged between the driving transistor and the light emission control transistor, and wherein a withstand voltage of the cascode transistor is lower than the withstand voltage of the light emission control transistor.

7. The apparatus according to claim 6, wherein a difference between the withstand voltage of the driving transistor and the withstand voltage of the cascode transistor is smaller than a difference between the withstand voltage of the driving transistor and the withstand voltage of the light emission control transistor.

8. The apparatus according to claim 7, wherein the withstand voltage of the driving transistor is equal to the withstand voltage of the cascode transistor.

9. The apparatus according to claim 6, further comprising a bias circuit configured to supply a bias signal to a control terminal of the cascode transistor, wherein a withstand voltage of a transistor arranged in the bias circuit is lower than the withstand voltage of the light emission control transistor.

10. The apparatus according to claim 9, wherein a difference between the withstand voltage of the driving transistor and the withstand voltage of the transistor arranged in the bias circuit is smaller than a difference between the withstand voltage of the driving transistor and the withstand voltage of the light emission control transistor.

11. The apparatus according to claim 10, wherein the withstand voltage of the driving transistor is equal to the withstand voltage of the transistor arranged in the bias circuit.

12. The apparatus according to claim 1, further comprising a signal output circuit configured to supply a luminance signal to a control terminal of the driving transistor, wherein a withstand voltage of a transistor arranged in the signal output circuit is lower than the withstand voltage of the light emission control transistor.

13. The apparatus according to claim 12, wherein a difference between the withstand voltage of the driving transistor and the withstand voltage of the transistor arranged in the signal output circuit is smaller than a difference between the withstand voltage of the driving transistor and the withstand voltage of the light emission control transistor.

14. The apparatus according to claim 13, wherein the withstand voltage of the driving transistor is equal to the withstand voltage of the transistor arranged in the signal output circuit.

15. The apparatus according to claim 1, wherein the withstand voltage of the light emission control transistor is the highest among the transistors included in the apparatus.

16. The apparatus according to claim 1, wherein the apparatus comprises a substrate and a plurality of pixels on the substrate, and wherein the plurality of pixels are arranged along a longitudinal direction of the substrate.

17. A display apparatus comprising:

the light emitting apparatus according to claim 1; and an active element connected to the light emitting apparatus.

18. A photoelectric conversion apparatus comprising:

an optical unit comprising a plurality of lenses;

an image sensor configured to receive light having passed through the optical unit; and a display unit configured to display an image, wherein the display unit displays an image captured by the image sensor, and comprises the light emitting apparatus according to claim 1.

19. An electric equipment comprising:

a housing provided with a display unit; and a communication unit provided in the housing and configured to communicate with the outside, wherein the display unit comprises the light emitting apparatus according to claim 1.

20. An illumination apparatus comprising:

a light source; and at least one of a light diffusion unit and an optical film, wherein the light source comprises the light emitting apparatus according to claim 1.

21. A wearable device comprising a display apparatus configured to display an image, wherein the display apparatus comprises the light emitting apparatus according to claim 1.

22. An image forming apparatus comprising:

a photosensitive member;

an exposure light source configured to expose the photosensitive member;

a developing device configured to apply a developing agent to the exposed photosensitive member; and a transfer device configured to transfer an image developed by the developing device to a print medium, wherein the exposure light source comprises the light emitting apparatus according to claim 1.

23. A light emitting apparatus comprising:

(1) a light emitting element;

(2) a driving transistor configured to supply a current to the light emitting element;

(3) a light emission control transistor configured to control light emission or non-light emission of the light emitting element; and (4) a signal output circuit configured to supply a luminance signal to a control terminal of the driving transistor, wherein the light emission control transistor is arranged between the light emitting element and the driving transistor, wherein the light emission control transistor is in an off-state during a non-light emission period, wherein a withstand voltage of the driving transistor is lower than a withstand voltage of the light emission control transistor, wherein a withstand voltage of a transistor arranged in the signal output circuit is lower than the withstand voltage of the light emission control transistor, and wherein a difference between the withstand voltage of the driving transistor and the withstand voltage of the transistor arranged in the signal output circuit is smaller than a difference between the withstand voltage of the driving transistor and the withstand voltage of the light emission control transistor.

* * * * *